(12) United States Patent
Stuemke (10) Patent No.: US 12,475,794 B2
(45) Date of Patent: Nov. 18, 2025

(54) METHOD AND DEVICE FOR DETERMINING A POSITION FOR AN EGO-VEHICLE AND VEHICLE

(71) Applicant: Robert Bosch GmbH, Stuttgart (DE)

(72) Inventor: Daniel Stuemke, Murrhardt (DE)

(73) Assignee: ROBERT BOSCH GMBH, Stuttgart (DE)

(*) Notice: Subject to any disclaimer, the term of this patent is extended or adjusted under 35 U.S.C. 154(b) by 484 days.

(21) Appl. No.: 17/864,620

(22) Filed: Jul. 14, 2022

(65) Prior Publication Data

US 2023/0024325 A1 Jan. 26, 2023

(51) Int. Cl.
*G08G 1/00* (2006.01)

(52) U.S. Cl.
CPC ........................... *G08G 1/20* (2013.01)

(58) Field of Classification Search
CPC ........... G08G 1/20; G08G 1/166; H04B 11/00
See application file for complete search history.

(56) References Cited

U.S. PATENT DOCUMENTS

| | | | | |
|---|---|---|---|---|
| 2004/0090117 A1* | 5/2004 | Dudeck | ............. | B60W 30/0953 303/193 |
| 2011/0238306 A1* | 9/2011 | Miucic | ................. | G01S 5/0284 701/469 |
| 2018/0203130 A1* | 7/2018 | Neubecker | ............... | G01S 19/46 |
| 2018/0247537 A1* | 8/2018 | Oh | ........................ | G05D 1/0293 |
| 2020/0200855 A1* | 6/2020 | Newman | ............... | G07C 5/0841 |

FOREIGN PATENT DOCUMENTS

| | | |
|---|---|---|
| DE | 102016214470 A1 | 2/2018 |
| DE | 102016225746 A1 | 6/2018 |
| DE | 102017120821 A1 | 8/2018 |
| DE | 102018206981 A1 | 11/2019 |
| DE | 102020207065 B3 | 2/2021 |
| DE | 102020128819 A1 | 5/2021 |

* cited by examiner

*Primary Examiner* — Abby J Flynn
*Assistant Examiner* — Paulo Roberto Gonzalez Leite
(74) *Attorney, Agent, or Firm* — NORTON ROSE FULBRIGHT US LLP (57) ABSTRACT

A method for determining an absolute position for an ego vehicle. The method includes a step of determining an other vehicle position of another vehicle and a piece of vehicle information of the other vehicle by using a vehicle signal that represents a vehicle-to-vehicle message of the other vehicle. The method furthermore comprises a step of determining a piece of vehicle information of the other vehicle and a relative position between the ego vehicle and the other vehicle by using a data signal provided by the other vehicle and a step of ascertaining the absolute position of the ego vehicle by using the other vehicle position and the relative position.

7 Claims, 4 Drawing Sheets

METHOD AND DEVICE FOR DETERMINING A POSITION FOR AN EGO-VEHICLE AND VEHICLE

FIELD

The present invention relates to a method and a device for determining a position for an ego vehicle as well as from a vehicle. A computer program is also a subject matter of the present invention.

BACKGROUND INFORMATION

An important step in the direction of autonomous driving is the networking of vehicles with one another and with the traffic infrastructure. In addition to basic vehicle information, it is possible via this communication to exchange information such as, for example, the current position or the braking distance, the number and seating position of the occupants as well as warnings of slower preceding vehicles or accidents. By exchanging data between vehicles and the traffic infrastructure, it is possible to adapt the braking behavior in front of traffic lights for example. It is also possible to utilize a communication between vehicles in concepts such as platooning, for example, where trucks are able to drive one behind the other with little distance between them without compromising traffic safety.

SUMMARY

The present invention provides an improved method for determining a position for an ego vehicle, furthermore an improved device which uses this method, and finally a corresponding computer program and an improved vehicle. As a result of the measures disclosed herein, advantageous refinements and improvements of the present invention are possible.

When using GNSS data, that is, data of a global navigation satellite system, for vehicle functions, it is possible that inaccuracies occur due to bad weather, for example. The approach presented here makes it possible to ascertain a vehicle position even in such a case and thereby to improve a functionality of the associated vehicle functions.

According to an example embodiment of the present invention, a method for determining an absolute position for an ego vehicle is provided, which comprises a step of determining a vehicle position of another vehicle and a piece of vehicle information of the other vehicle by using a vehicle signal that represents a vehicle-to-vehicle message of another vehicle. The method furthermore comprises a step of determining a piece of vehicle information of the other vehicle and a relative position between the ego vehicle and the other vehicle by using a data signal provided by the other vehicle and a step of ascertaining the absolute position of the ego vehicle by using the position of the other vehicle and the relative position.

The method may be used advantageously for vehicles that are operated in at least partially automated fashion. The vehicle information may include for example an identification, a so-called transmitting vehicle ID, and/or for example traffic information, for example regarding a traffic jam or an accident situation. The vehicle information and the absolute position may be read out of the vehicle signal. The relative position may define a positioning of the two vehicles with respect to each other, that is, for example, distance information and direction information. The relative position may be ascertained by using the data signal, for example via an evaluation of the propagation time of the data signal and/or of an angle of incidence of the data signal. The vehicle information may be read out of the data signal. The signals may be received by suitable sensor devices. Because the vehicle information of the other vehicle is transmitted via two different channels, the absolute position of the other vehicle transmitted via the vehicle signal may be unequivocally assigned to the relative position determined by using the data signal. Advantageously, the method makes it possible to improve a position determination of the ego vehicle.

According to one specific example embodiment of the present invention, the vehicle signal may represent a signal provided by the other vehicle in the radio frequency range. Advantageously, it is thus possible to make use of communication devices that often already exist for communication between vehicles.

According to one specific example embodiment of the present invention, the data signal may represent a signal provided acoustically by the other vehicle. For example, the data signal may be implemented as an ultrasonic signal. Such a signal may be readily transmitted by using ultrasonic sensors that may already be installed on the vehicle, for example for distance determination. The range of such a signal of 500 m, for example, is quite sufficient for this purpose. Additionally or alternatively, the data signal or a parallel further data signal may represent a signal provided optically by the other vehicle. Advantageously, the data signal may be emitted as a light signal by using a light source already installed in the other vehicle, for example a tail light or a headlight. If the data signal is suitably encoded, the vehicle information may be read out readily from the data signal. The relative position may be ascertained from the data signal by suitable signal evaluation.

According to an example embodiment of the present invention, in a step of receiving, the data signal may be received by using at least one ultrasonic sensor of the ego vehicle. If multiple ultrasonic sensors are installed in the ego vehicle, the direction of incidence of the data signal may be readily inferred on the basis of the knowledge of an orientation of an ultrasonic sensor receiving the data signal.

If the data signal represents a light signal, the data signal may be received by using an image detection device of the ego vehicle. Advantageously, for this purpose, it is possible to use a camera that is often already installed in the vehicle for detecting the surroundings. By using one or multiple images provided by the image detection device, it is possible to determine a distance and a direction of the other vehicle with regard to the ego vehicle and thus to determine the relative position by way of a suitable image evaluation.

According to one specific example embodiment of the present invention, the method may comprise a step of comparing the vehicle information determined from the vehicle signal with the vehicle information determined from the data signal. The step of ascertaining the absolute position may be performed if the vehicle information determined from the vehicle signal matches the vehicle information determined from the data signal. This means that the pieces of vehicle information can be compared with each other in order to be able to assign the absolute position transmitted via the vehicle signal to the relative position ascertained from the data signal.

According to one specific embodiment of the present invention, in the step of determining, it is possible to determine the vehicle information as vehicle identification. Advantageously, for this purpose, vehicle information and absolute positions received from different vehicles may be assigned to the respective vehicles and thereby a location determination of the ego vehicle may be improved, if these vehicles additionally transmit their vehicle identification via a corresponding data signal.

Additionally or alternatively, instead of another vehicle, it is possible to use a traffic facility for determining the absolute position. In this case, signals corresponding the vehicle signal and the data signal are not transmitted by the other vehicle, but by the traffic facility. In this case, the vehicle information may represent a position of a traffic facility.

Advantageously, the traffic facility may be developed as part of a traffic infrastructure, such as traffic lights or traffic signs for example, and may accordingly transmit information to passing vehicles.

According to an example embodiment of the present invention, the method may comprise a step of determining an ego position of the ego vehicle. The step of ascertaining the absolute position may be carried out when a quality of the ego position is below a threshold value. The ego position may be ascertained for example within the ego vehicle by using GNSS data. If the ego position cannot be determined reliably, for example because they are inaccurate due to a rain shower, position data of other vehicles may be used in order to be able to determine the absolute position of the ego vehicle more accurately. This advantageously makes it possible to verify or render the self-determined ego position more concrete, which may be relevant for example for further vehicle functions such as a navigation function for example.

According to one specific example embodiment of the present invention, the steps of the method may be performed repeatedly. Advantageously, the steps of the method may be performed or controlled repeatedly over regular intervals so as to be able to determine at least an updated absolute position of the ego vehicle.

This method may be implemented for example in software or hardware or in a mixed form of software and hardware, for example in a control unit.

The present invention also provides a device which is developed, in particular configured, to carry out, control or implement the steps of a variant of a method provided here in corresponding devices. This variant of an embodiment of the approach in the form of a device is also able to achieve the objective of this approach quickly and efficiently.

For this purpose, according to an example embodiment of the present invention, the device may include at least one processing unit for processing signals or data, at least one memory unit for storing signals or data, at least one interface to a sensor or an actuator for reading in sensor signals from the sensor or for outputting data signals or control signals to the actuator and/or at least one communication interface for reading in or outputting data that are embedded in a communication protocol. The processing unit may be for example a signal processor, a microcontroller or the like, while the memory unit may be a flash memory, an EEPROM or a magnetic memory unit. The communication interface may be designed to read in or output data wirelessly and/or in line-conducted fashion, a communication interface that is able to read in or output line-conducted data being able to read in these data for example electrically or optically from a corresponding data transmission line or output them to a corresponding data transmission line.

In the present case, a device may be understood to refer to an electrical device that processes sensor signals and outputs control signals and/or data signals as a function thereof. The device may include an interface developed in the form of hardware and/or software. In a hardware implementation, the interfaces may be part of a so-called system ASIC, for instance, which encompasses a wide variety of functions of the device. However, it is also possible for the interfaces to be separate, integrated circuits or to be at least partially made up of discrete components. In a software development, the interfaces may be software modules which, for example, are present on a microcontroller in addition to other software modules.

According to an example embodiment of the present invention, also advantageous is a computer program product or computer program having program code that may be stored on a machine-readable carrier or memory medium such as a semiconductor memory, a hard-disk memory or an optical memory, and which is used to carry out, implement and/or control the steps of the method according to one of the specific embodiments described above, in particular when the program product or program is executed on a computer or a device.

Furthermore, according to an example embodiment of the present invention, a vehicle is presented, which comprises a receiving device for receiving a vehicle signal. The vehicle signal represents a vehicle-to-vehicle message of another vehicle, which comprises a vehicle position and a piece of vehicle information of another vehicle. The vehicle furthermore has a sensor device for receiving a data signal that represents a piece of vehicle information of the other vehicle and a relative position between the ego vehicle and the other vehicle. A device in an aforementioned variant is developed to process the signals received by the receiving device and the sensor device.

The vehicle may be developed for example as a highly automated vehicle with regard to autonomous driving. The receiving device may be implemented for example as a radio receiver, which may be designed, for example, to detect signals outside of the vehicle and, additionally or alternatively, to evaluate these signals. The sensor device may comprise for example a plurality of vehicle sensors but includes, however, an ultrasonic sensor and at least one image detection device. The image detection device is able to detect for example the surroundings in a pictorial manner. The device may be designed, for example, to process the signals and, additionally or alternatively, it may be developed as a control unit or at least comprise a control unit.

Exemplary embodiments of the present invention are depicted in the figures and described in greater detail in the description below.

DETAILED DESCRIPTION OF EXAMPLE EMBODIMENTS

In the subsequent description of favorable exemplary embodiments of the present invention, identical or similar reference numerals are used for elements shown in the various figures that act similarly, a repeated description of these elements being omitted in this case.

Figure 1:
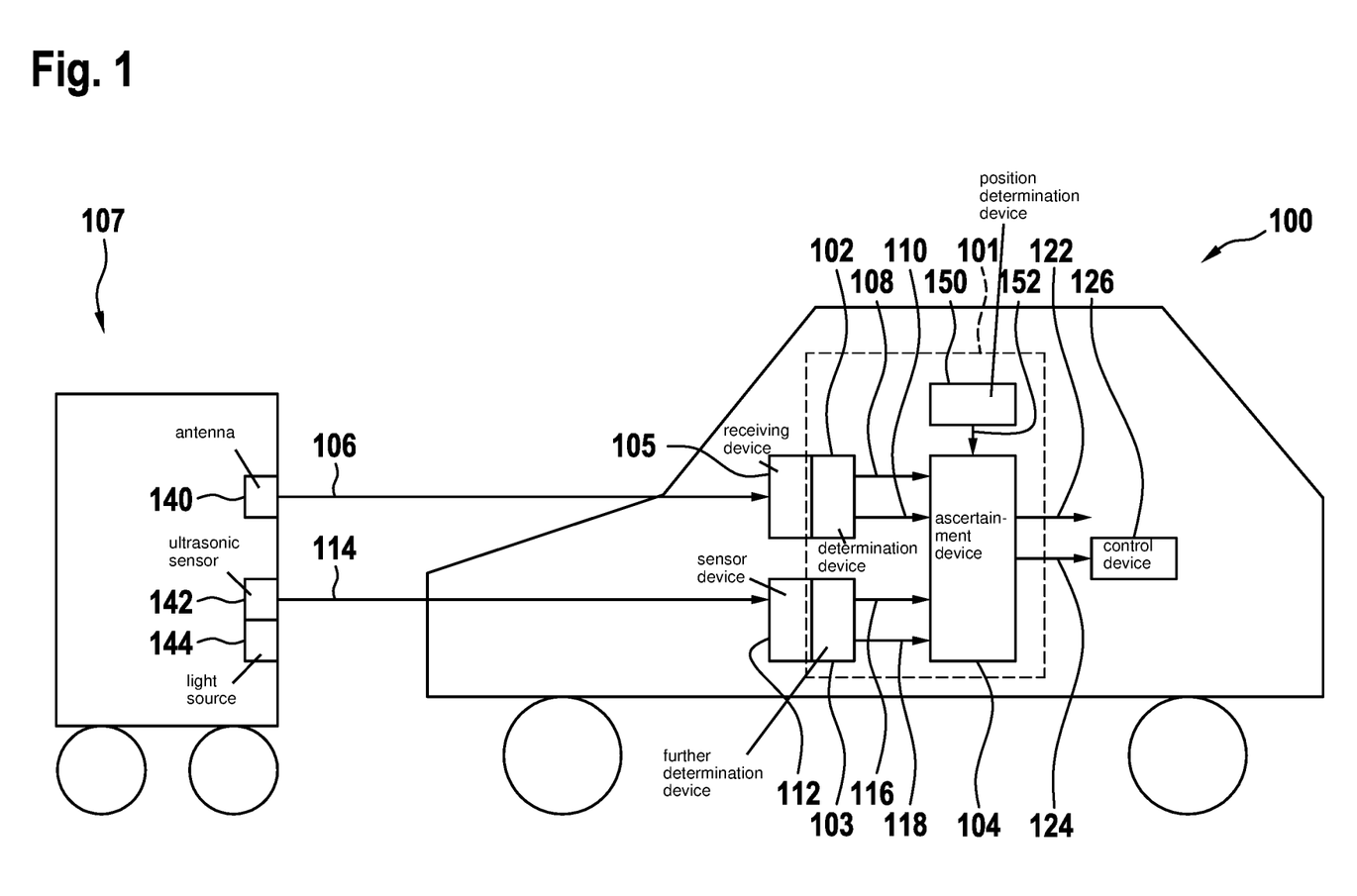
FIG. 1 shows a schematic illustration of a vehicle according to one exemplary embodiment of the present invention.

FIG. 1 shows a schematic illustration of a vehicle 100 according to one exemplary embodiment. Vehicle 100 is implemented for example as a highly automated passenger car. Vehicle 100 is also called ego vehicle 100 below and includes a device 101 that is designed to control or carry out a method, such as is described in one of the subsequent figures, for determining an absolute position of the ego vehicle 100 in corresponding units. The device 101 includes, for example, a determination device 102, a further determination device 103 and an ascertainment device 104. The determination device 102 is connected to a receiving device 105 of the ego vehicle 100, which is designed to receive a vehicle signal 106. Vehicle signal 106 represents a vehicle-to-vehicle message (V2V) of another vehicle 107, which is also called a car-to-car message (C2C). The vehicle signal 106 represents or comprises a vehicle position 108 and a piece of other vehicle information 110 of the other vehicle 106, which are determined by the determination device 103 from the vehicle signal 106. The ego vehicle 100 furthermore has a sensor device 112 for receiving a data signal 114 that represents or comprises a piece of vehicle information 116 of the other vehicle 107 and a relative position 118 between the ego vehicle 100 and the other vehicle 107. According to this exemplary embodiment, the sensor device 112 may be implemented as an ultrasonic sensor or as an image detection device and in an alternative exemplary embodiment may comprise both an ultrasonic sensor as well as an image detection device.

The further determination device 103 connected to the sensor device 112 determines for example the piece of vehicle information 116 and the relative position 118 by a suitable evaluation of the data signal 114. The ascertainment device 104 is designed to process the signals 106, 114 received by way of the determination device 102 and the further determination device 103 and to ascertain an absolute position 122 of the ego vehicle 100.

The absolute position 122 is used, for example, in order to provide a control signal 124, which takes the absolute position 122 into account, to an interface to a control device 126 of the ego vehicle 100, in order to control or implement a vehicle function such as for example a braking function of the vehicle or for example an evasive maneuver.

According to one exemplary embodiment, the vehicle signal 106 is transmitted using an antenna 140 of the other vehicle 107 and the data signal 114 is transmitted either using an ultrasonic sensor 142 or a light source 144, for example of a tail light or a headlight of the other vehicle 107.

According to one exemplary embodiment, the ego vehicle 100 comprises a position determination device 150, which is designed to determine an ego position 152 of the ego vehicle 100 for example by using a satellite-based navigation system. According to one exemplary embodiment, the ascertainment device 104 is designed to determine the absolute position 122 only when an accuracy of the ego position 152 falls below a threshold value.

Otherwise, the ascertainment device 104 is designed for example to provide the ego position 152 as the absolute position 122.

For transmitting the vehicle signal 106, it is possible to use for example conventional technologies that allow for Car2Car and Car2x communication. Such a vehicle signal 106 comprises data, which are transmitted for example via C-ITS (standards for cooperative intelligent transport systems and services) to receivers, for example here the ego vehicle 100, in the surroundings of up to 500 m of the transmitter. For reasons of privacy protection, vehicle signal 106 does not contain a definite assignment to a license plate or other features critical in this regard. Instead, an identifier is transmitted along as the vehicle information, which according to one exemplary embodiment is newly generated at every vehicle start and also in other situations and is not definitely assignable.

According to one exemplary embodiment of the present invention, the data signal 114 additionally allows for a, for example ultrasound-based and/or camera-based vehicle identification with a relative position determination in the Car2Car and Car2x environment. On the basis of the vehicle information, for example the identifier in a received message of the vehicle signal 106, the approach presented here describes a possibility of allowing for a temporary assignment of the message to the other vehicle 107 within the visual range of the installed sensor device 112, while the ego vehicle 100 is traveling. By assigning the received messages and the information contained in them, such as for example the current position of the transmitter designated as the other vehicle position 108, it is possible to correct the ego-vehicle's own information, for example the ego position in the event of poor GPS reception in combination with a distance measurement of the stereo camera system, or to respond better to hazardous situations. Car2Car and/or Car2x capable vehicles, such as vehicles 100, 107, transmit their identifier for example via a physical transmission channel to vehicles 100, 107 in the surroundings, the transmission channel allowing for a definite assignment. This transmission occurs for example via one or more of the following paths:

In the case of vehicles 100, 107 standing or driving very closely one behind the other, the vehicles emit their vehicle information for example via installed ultrasonic sensors in the form of an identifier in encoded form or for example also modulated onto the signals for distance measurement. The sensors, here of the sensor device 112 of ego vehicle 100, receive this identifier via the ultrasonic transmission, which according to this exemplary embodiment occurs by way of data signal 114. According to one exemplary embodiment, an ultrasonic control unit comprised for example by the further determination device 103 demodulates the identifier and the vehicle software assigns it to the preceding and/or following other vehicle 107.

In the case of nearby or more distant vehicles visible for the image detection device of sensor device 112, which have activated illumination, such as for example low beam, turn indicator, brake light, etc., according to one exemplary embodiment, the vehicle information in the form of the identifier is modulated onto a pulse width modulated signal, a so-called PWM signal of the headlights of the other vehicle 107, so that the resulting "flickering" is not detectable for the human eye, but is detectable for a suitable image detection device of the ego vehicle 100. Using software-side image processing, which is integrated for example in the further determination device 103, the identifier is ascertained, according to one exemplary embodiment, on the basis of the intensity differences of the illumination in consecutive frames. After an initial assignment is completed, a list is maintained in the vehicle software for example, in order to continue to track the other vehicle position 108 of the transmitting other vehicles 107. This is done with the aid of the image detection device. Depending on whether the other vehicle 107 to be observed has license plates (in some countries or regions only rear license plates are required for example), different strategies are possible when the other vehicle 107 briefly disappears from the visual range, in order to keep the assignment consistent. When the license plate exists and is visible for example, optical character recognition (OCR) is used. The message identifier is linked to the characters on the license plate. When the license plate does not exist or is not visible, a one-shot image classifier is used, for example. For this purpose, the software temporarily stores images of the other vehicle 107 and uses these for recognition at a later point in time. In the case of a temporarily or permanently activated illumination, for example, the already mentioned approach of the modulation of the PWM signals of the illumination is used. Additionally, tracking algorithms, such as Kalman filters or particle filters, are used, in order to estimate the trajectory of the observed other vehicles 107. The relative position 118 of the observed vehicle 107 with respect to the ego vehicle 100 is determined merely optionally by 3D reconstruction of the images of the stereo camera system.

Figure 2:
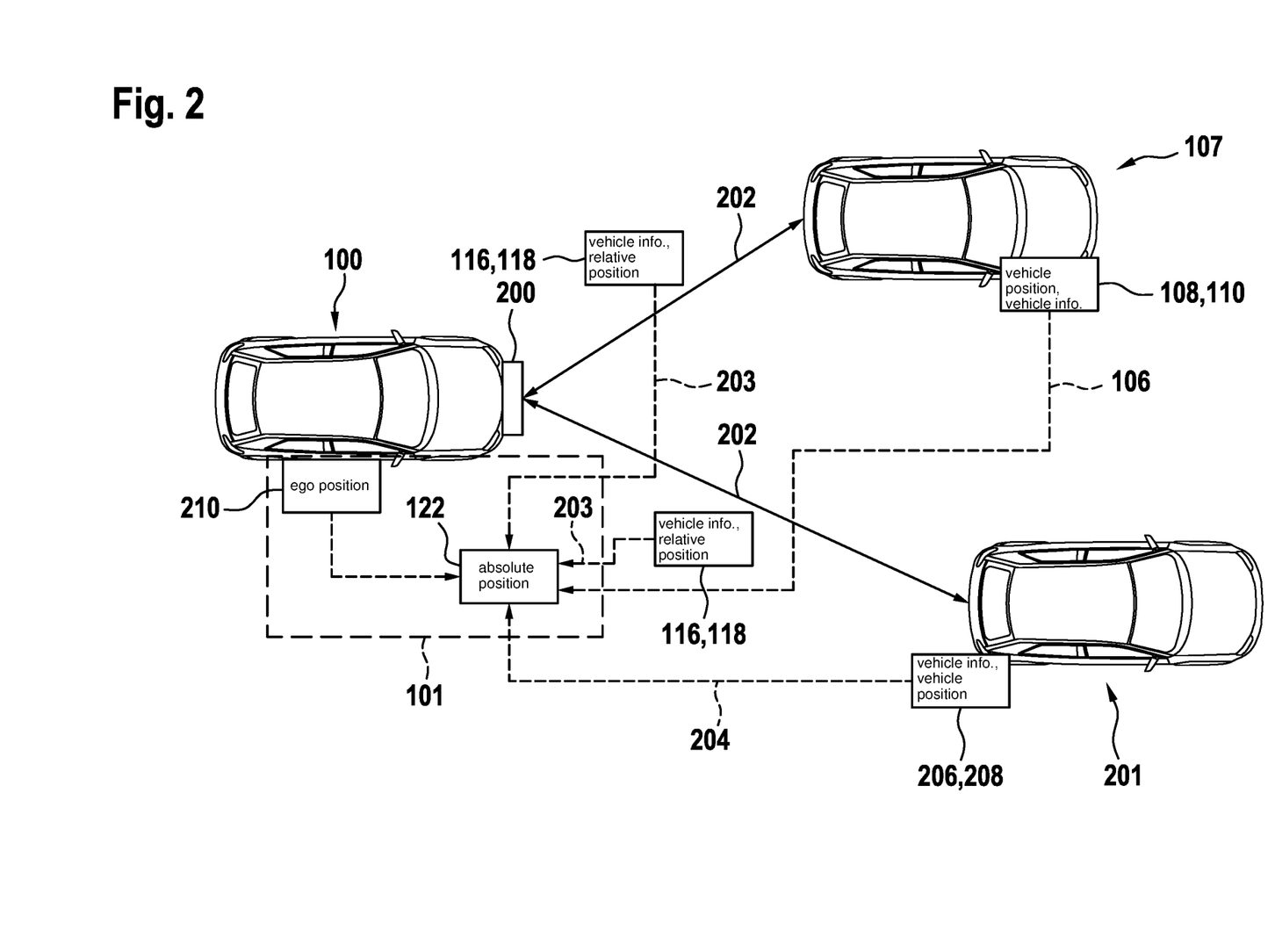
FIG. 2 shows a schematic illustration of an exemplary embodiment of a vehicle according to the present invention.

FIG. 2 shows a schematic illustration of an exemplary embodiment of a vehicle 100 in a driving situation. Vehicle 100 is embodied for example as the ego vehicle 100, as was described in FIG. 1. According to this exemplary embodiment, ego vehicle 100 has an image detection device 200, which detects the other vehicle 107 and optionally at least one further other vehicle 201 in the vehicle surroundings of the ego vehicle 100. According to one exemplary embodiment, the image detection device 200 is used in order to determine vehicle information 116 transmitted by the other vehicles 107, 201 via data signals and to ascertain, on the basis of the data signals, relative positions 118 between the ego vehicle 100 and the other vehicles 107, 201. The vehicle information 116 and the relative position 118 are received merely optionally via a light signal 202 as the data signal and/or via an ultrasonic signal 203.

Furthermore, the ego vehicle 100 also receives the vehicle signal 106 from the other vehicle 107 as well as a further vehicle signal 204 from the further additional vehicle 201 via a V2V message. The vehicle signal 106 comprises the vehicle information 110 and the other vehicle position 108, at which the other vehicle 107 is located for example at a corresponding point in time. The further vehicle signal 204 analogously comprises a further piece of vehicle information 206 and a further other vehicle position 208. The signals 106, 202, 203, 204 provided by the other vehicles 106, 201 are processed by device 101 by using an ego position 210 of ego vehicle 100.

According to one exemplary embodiment, the signals 106, 202, 203, 204 provided by the other vehicles 106, 201 are helpful when ego vehicle 100 has difficulty estimating its ego position independently, when accordingly there is a low degree of confidence in the ego position, for example. Instead or in addition, it is possible to receive messages from the other vehicle 107 and from the additional other vehicle 201 via signals 106, 202, 203, 204 and to use these for determining the position of the ego vehicle 100. Using the presented approach, ego vehicle 100 is able to assign the received messages to the concrete other vehicles 107, 201, which were detected for example by the image detection device 200. With all these pieces of information, ego vehicle 100 now determines its position accurately. Alternatively, the further other vehicle 201 detects for example an obstacle in its traffic lane and reports it via the Car2Car network to vehicles 100, 107 within reception range. With the aid of the presented approach, the ego vehicle 100 assigns the hazard report to the further other vehicle 201, in spite of its poor current position estimation, and thereupon moves into the left lane, in order to create room for the further other vehicle 201 to perform an evasive maneuver.

Figure 3:
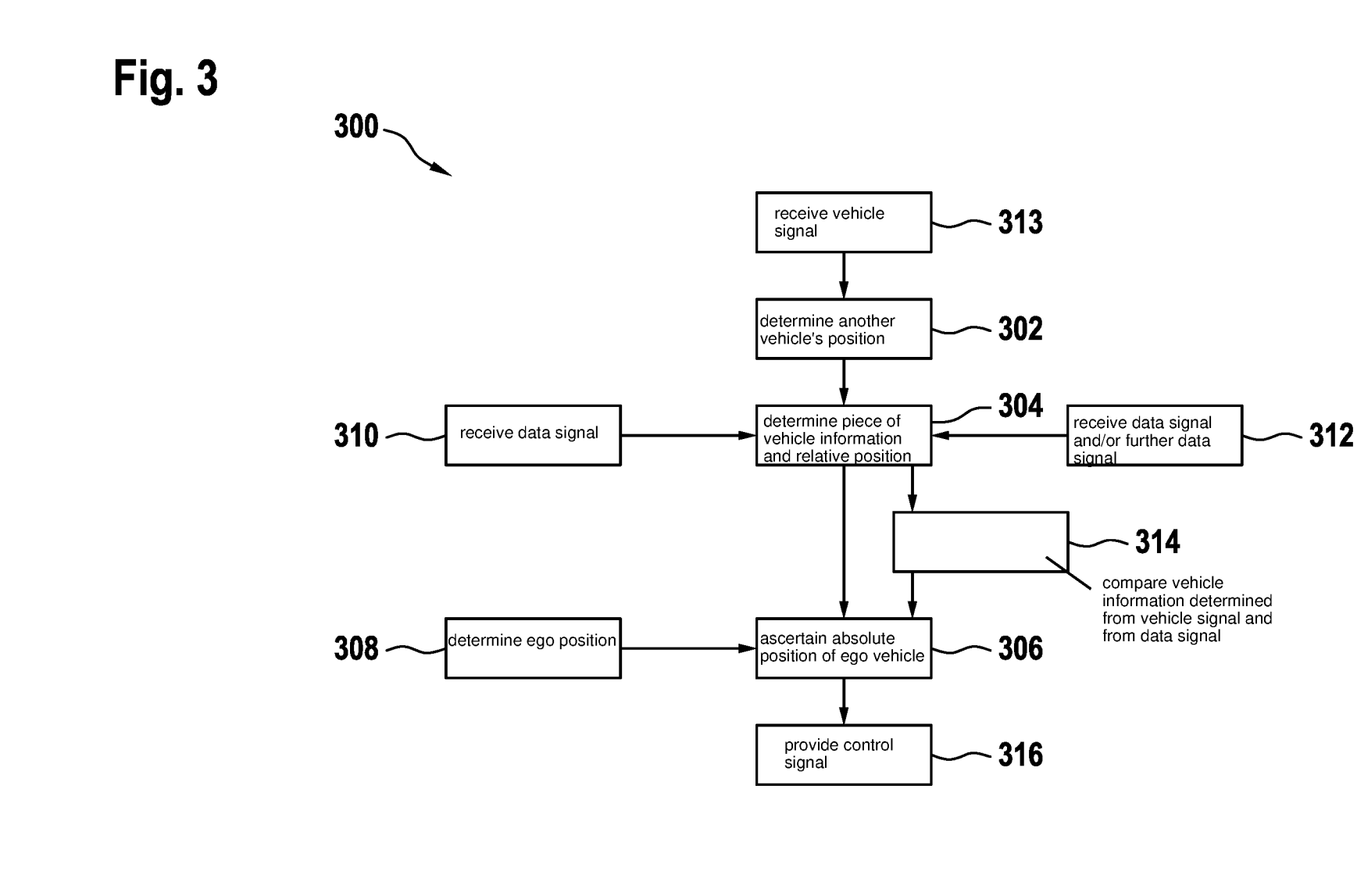
FIG. 3 shows a flow chart of a method for determining an absolute position for an ego vehicle according to one exemplary embodiment of the present invention.

FIG. 3 shows a flow chart of a method 300 for determining an absolute position for an ego vehicle according to one exemplary embodiment. The method 300 may be implemented for example for an ego vehicle, as was described in one of the FIG. 1 or 2. Method 300 is controlled for example by a device, as was likewise described in FIGS. 1 and 2.

Method 300 comprises a step 302 of determining an other vehicle position of the other vehicle and a piece of vehicle information of the other vehicle by using a vehicle signal that represents a vehicle-to-vehicle message of an other vehicle. The vehicle information represents for example a vehicle identification and, if applicable, additionally a hazard report. Method 300 furthermore comprises a step 304 of determining a piece of vehicle information of the other vehicle and a relative position between the ego vehicle and the other vehicle by using a data signal provided by the other vehicle and a step 306 of ascertaining the absolute position of the ego vehicle by using the position of the other vehicle and the relative position.

Method 300 furthermore comprises merely optionally a step 308 of determining an ego position of the ego vehicle. If a quality of the ego position is below a threshold value, then the absolute position of the ego vehicle is additionally determined in step 306 by using the position of the other vehicle and the relative position. This means that for example GNSS data regarding its position are available to the ego vehicle. According to this exemplary embodiment, if the ego vehicle is located in an area without radio reception for example, so that the ego position data are inaccurate, step 306 of determining the absolute position is subsequently performed as an alternative to the ego position data or for correcting the ego position data.

According to one specific embodiment, method 300 comprises a step 310 of receiving the data signal by using an ultrasonic sensor of the ego vehicle and/or a step 312 of receiving the data signal or a further data signal by using an image detection device of the ego vehicle. According to one exemplary embodiment, the vehicle signal is received in a step 313 by using a radio antenna for receiving a signal in the radio frequency range.

According to one exemplary embodiment, method 300 furthermore comprises a step 314 of comparing the vehicle information determined from the vehicle signal with the vehicle information determined from the data signal. The step 306 of ascertaining the absolute position may be performed when the vehicle information determined from the vehicle signal matches the vehicle information determined from the data signal.

According to one exemplary embodiment, method 300 optionally comprises a step 316 of providing a control signal to an interface to a control device of the vehicle in order to control a vehicle function of the vehicle. According to one exemplary embodiment, the absolute position of the ego vehicle determined in step 306 enters into the provision of the control signal. The vehicle function represents for example a brake assist system or a lane change assist system for evading an obstacle for example.

According to this exemplary embodiment, the data signal represents a signal provided acoustically or optically by the other vehicle. The information transmitted via a data signal and/or a vehicle signal is determined for example in step 302 and/or in step 304 as a vehicle identification, abbreviated as ID, or for example as a position of a traffic facility. The traffic facility is developed for example as a traffic light or comprises for example a traffic infrastructure outside of the vehicle, for example signs.

In other words, the approach presented here describes a method 300 for a receiver vehicle, which is designated as the ego vehicle according to this exemplary embodiment, having a poor ego position estimation, which receives a V2V message comprising an absolute position of a transmitting vehicle. Method 300 makes it possible for the receiver vehicle to improve the ego position estimation on the basis of the received position of the transmitting vehicle and ultrasonic data or camera data comprising the vehicle. For this purpose, the transmitting vehicle, which is designated as the other vehicle according this exemplary embodiment, transmits a transmitting vehicle ID to the receiver vehicle both via the V2V message as well as via an ultrasonic or light signal. The ultrasonic or light signal is detected by an ultrasonic sensor or by the image detection device of the receiver vehicle and the transmitting vehicle ID contained therein is read out. Using the ultrasonic sensor or the image detection device, the receiver vehicle at the same time determines a relative position with respect to the transmitting vehicle. On the basis of the received absolute position of the transmitting vehicle and the relative position, the receiver vehicle ascertains its own absolute position.

Figure 4:
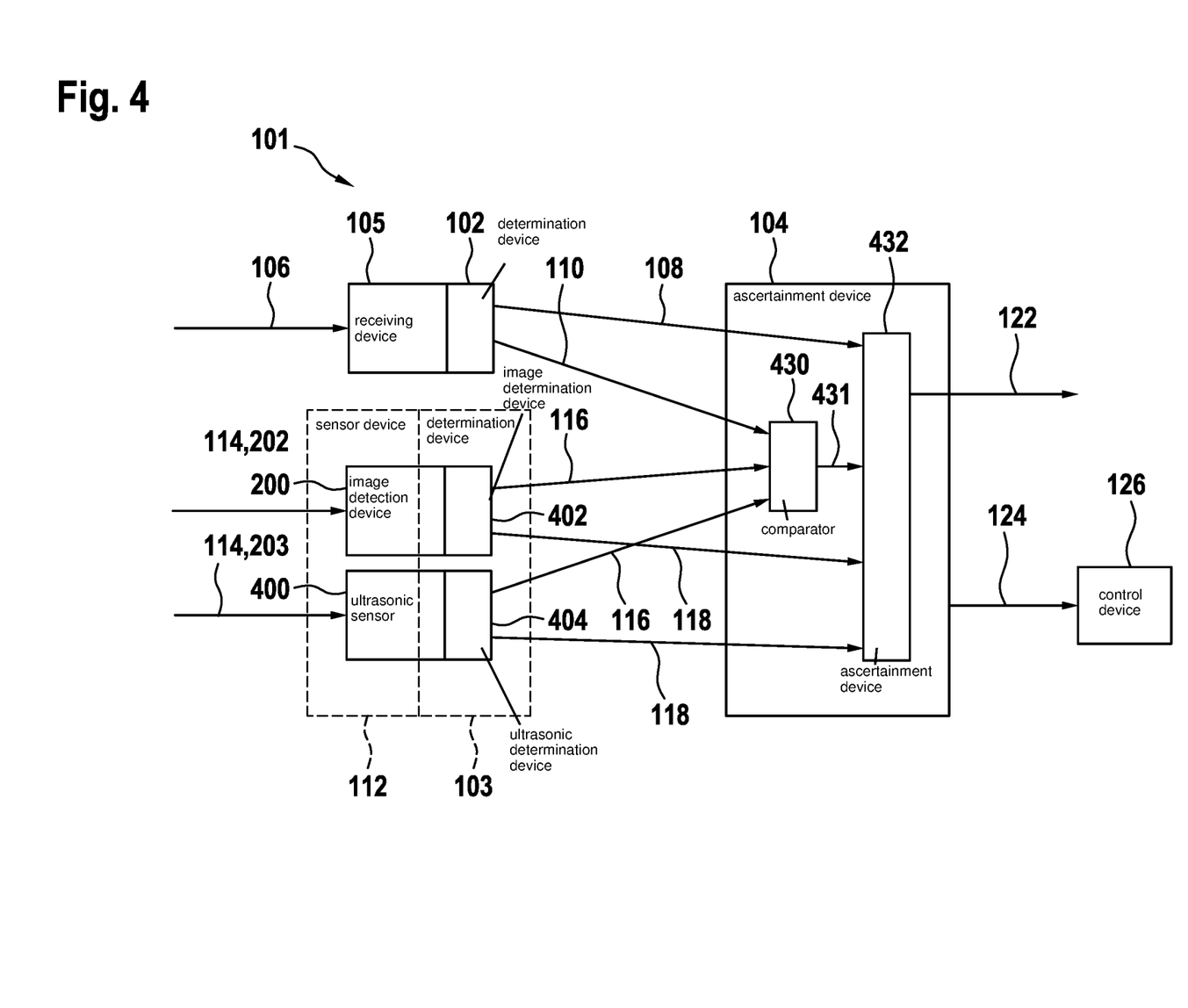
FIG. 4 shows a block diagram of a device according to one exemplary embodiment of the present invention.

FIG. 4 shows a block diagram of a device 101 according to one exemplary embodiment. The illustrated device 101 corresponds to or resembles for example the device 101 described in one of FIG. 1 or 2. According to this exemplary embodiment, device 101 includes the determination device 102, which is designed to determine the other vehicle position 108 and the vehicle information 110 by using the vehicle signal 106, which was received for example by the receiving device 105. Device 101 furthermore includes the further determination device 103, which is designed to determine the vehicle information 116 and the relative position 118 by using the data signal 114, which was received by sensor device 112.

According to this exemplary embodiment, sensor device 112 comprises an image detection device 200, which receives the data signal 114 as a light signal 202. Additionally or alternatively, the sensor device 112 comprises an ultrasonic sensor 400, which receives the data signal 114 or a corresponding further data signal as ultrasonic signal 203. For example, the image detection device 200 is connected to an image determination device 402, which is designed to read the vehicle information 116 out of the light signal 202 and to ascertain the relative position 118 by using light signal 202. Analogously, the ultrasonic sensor 400 is connected to an ultrasonic determination device 404, which is designed to read the vehicle information 116 out of the ultrasonic signal 203 and to ascertain the relative position 118 by using the ultrasonic signal 203. Merely optionally, the image determination device 402 and the ultrasonic determination device 404 are implemented or implementable as part of the further determination device 103.

The ascertainment device 104 is designed to ascertain the absolute position 122 of the ego vehicle by using the other vehicle position 108 and the relative position 118 ascertained either by using the light signal 202 or the ultrasonic signal 203, or both signals 202, 203. According to one exemplary embodiment, the ascertainment device 104 for this purpose has a comparator device 430, which is designed to compare the vehicle information 110 read out of the vehicle signal 106 with the vehicle information 116, which is read either out of the light signal 202 or the ultrasonic signal 203, or out of both signals 202, 203. If the comparator device 430 ascertains a comparison result 431 indicating a match of the vehicle information 110, 116, then the absolute position 122 is ascertained as described, for example by using an ascertainment device 432. The comparison makes it possible to ensure that the vehicle signal 106 and the data signal or data signals 114 were transmitted by one and the same other vehicle.

Optionally, using the absolute position 122, a control signal 124 for controlling a control device 126 is provided.

The invention claimed is:

1. A method for an ego vehicle, the method comprising the following steps:
   obtaining, via an antenna of the ego vehicle, a vehicle-to-vehicle message transmitted from a first other vehicle over a vehicle communication network;
   determining, by a processor system of the ego vehicle processing the vehicle-to-vehicle message, a remote position of the first other vehicle and an message-provided-identification identifying the first other vehicle, which are included in the vehicle-to-vehicle message;
   detecting, with a sensor of the ego vehicle, a visual or acoustic signal impinging on the sensor from a surroundings of the ego vehicle;
   determining, by the processor system processing the visual or acoustic signal, a relative position between the ego vehicle and a location associated with the visual or acoustic signal;
   demodulating, by the processor system, the visual or acoustic signal to reconstruct a signal-provided-identification that is modulated onto the visual or acoustic signal;
   based on a comparison of the signal-provided-identification and the message-provided-identification, identifying, by the processor system, the first other vehicle as a source of the visual or acoustic signal;
   based on the identification of the first other vehicle as the source, the processor system using the remote position of the first other vehicle included in the vehicle-to-vehicle message and the determined relative position between the ego vehicle and the location associated with the visual or acoustic signal to ascertain an absolute position of the ego vehicle; and
   controlling, by the processor system, an automated drive or braking maneuver of the ego vehicle position based on the ascertained absolute position of the ego vehicle.

2. The method as recited in claim 1, wherein the vehicle-to-vehicle message is provided by the first other vehicle in a radio frequency range, and the visual or acoustic signal is an ultrasonic signal provided acoustically or a light signal provided optically by the first other vehicle.

3. The method as recited in claim 1, wherein the sensor is an ultrasonic sensor of the ego vehicle.

4. The method as recited in claim 1, wherein the sensor is an image detection device of the ego vehicle.

5. The method as recited in claim 1, further comprising:
   determining an ego position of the ego vehicle using satellite signals;
   wherein the step of ascertaining the absolute position of the ego vehicle using the remote position of the first other vehicle is carried out in response to satisfaction of a condition that a quality of the ego position determined using the satellite signals is below a predefined threshold value.

6. A system of an ego vehicle, the system comprising:
   an antenna;
   a sensor; and
   a processor system;
   wherein:

the ego vehicle is configured to obtain, via the antenna of the ego vehicle, a vehicle-to-vehicle message transmitted from a first other vehicle over a vehicle communication network;

the processor system is configured to determine, by processing the vehicle-to-vehicle message, a remote position of the first other vehicle and an message-provided-identification identifying the first other vehicle, which are included in the vehicle-to-vehicle message;

the ego vehicle is configured to detect, with the sensor, a visual or acoustic signal impinging on the sensor from a surroundings of the ego vehicle; and the processor system is configured to:
- determine, by processing the visual or acoustic signal a relative position between the ego vehicle and a location associated with the visual or acoustic signal;
- demodulate the visual or acoustic signal to reconstruct a signal-provided-identification that is modulated onto the visual or acoustic signal;
- based on a comparison of the signal-provided-identification and the message-provided-identification, identify the first other vehicle as a source of the visual or acoustic signal;
- based on the identification of the first other vehicle as the source, use the remote position of the first other vehicle included in the vehicle-to-vehicle message and the determined relative position between the ego vehicle and the location associated with the visual or acoustic signal to ascertain an absolute position of the ego vehicle; and
- control an automated drive or braking maneuver of the ego vehicle position based on the ascertained absolute position of the ego vehicle.

7. A non-transitory machine-readable storage medium on which is stored a computer program that is executable by a computer of an ego vehicle and that, when executed by the computer, causes the computer to perform the following steps:
- obtaining, via an antenna of the ego vehicle, a vehicle-to-vehicle message transmitted from a first other vehicle over a vehicle communication network;
- determining, by processing the vehicle-to-vehicle message, a remote position of the first other vehicle and an message-provided-identification identifying the first other vehicle, which are included in the vehicle-to-vehicle message;
- detecting, with a sensor of the ego vehicle, a visual or acoustic signal impinging on the sensor from a surroundings of the ego vehicle;
- determining, by processing the visual or acoustic signal, a relative position between the ego vehicle and a location associated with the visual or acoustic signal;
- demodulating the visual or acoustic signal to reconstruct a signal-provided-identification that is modulated onto the visual or acoustic signal;
- based on a comparison of the signal-provided-identification and the message-provided-identification, identifying the first other vehicle as a source of the visual or acoustic signal;
- based on the identification of the first other vehicle as the source, using the remote position of the first other vehicle included in the vehicle-to-vehicle message and the determined relative position between the ego vehicle and the location associated with the visual or acoustic signal to ascertain an absolute position of the ego vehicle; and
- controlling an automated drive or braking maneuver of the ego vehicle position based on the ascertained absolute position of the ego vehicle.

\* \* \* \* \*